US009230764B2

(12) United States Patent
Hille

(10) Patent No.: US 9,230,764 B2
(45) Date of Patent: Jan. 5, 2016

(54) FIRST-FAIL-SAFE ELECTROMOTIVE FURNITURE DRIVE

(75) Inventor: Armin Hille, Bielefeld (DE)

(73) Assignee: DEWERTOKIN GMBH, Kirchlengern (DE)

( * ) Notice: Subject to any disclaimer, the term of this patent is extended or adjusted under 35 U.S.C. 154(b) by 1025 days.

(21) Appl. No.: 13/384,361

(22) PCT Filed: Jul. 14, 2010

(86) PCT No.: PCT/EP2010/060143

§ 371 (c)(1), (2), (4) Date: Mar. 27, 2012

(87) PCT Pub. No.: WO2011/006930

PCT Pub. Date: Jan. 20, 2011

(65) Prior Publication Data

US 2012/0194106 A1 Aug. 2, 2012

(30) Foreign Application Priority Data

Jul. 14, 2009 (DE) ..................... 20 2009 005 020 U

(51) Int. Cl.

| | |
|---|---|
| ***H02K 7/14*** | (2006.01) |
| ***H02P 5/00*** | (2006.01) |
| ***H02P 7/00*** | (2006.01) |
| ***G05B 11/01*** | (2006.01) |
| ***H01H 47/00*** | (2006.01) |
| ***A47C 20/04*** | (2006.01) |
| *A61G 7/018* | (2006.01) |

(52) U.S. Cl.

CPC ............ *H01H 47/002* (2013.01); *A47C 20/041* (2013.01); *A61G 7/018* (2013.01)

(58) Field of Classification Search

CPC ........ H01H 3/26; B04B 13/003; B23Q 5/341; G02B 6/4452; G09F 19/02

USPC ........................ 318/3, 85, 120, 432, 490, 560

See application file for complete search history.

(56) References Cited

U.S. PATENT DOCUMENTS

| | | | | |
|---|---|---|---|---|
| 2005/0029980 | A1* | 2/2005 | Bokamper | 318/625 |
| 2007/0285035 | A1* | 12/2007 | Roither et al. | 318/120 |
| 2008/0012516 | A1* | 1/2008 | Ctvrtnicek | 318/490 |
| 2011/0037425 | A1* | 2/2011 | Gehrke et al. | 318/490 |

FOREIGN PATENT DOCUMENTS

| | | |
|---|---|---|
| DE | 200 19 583 | 2/2001 |
| DE | 100 12 050 | 10/2001 |
| DE | 201 13 125 | 2/2002 |
| DE | 201 19 899 | 2/2002 |
| DE | 103 41 705 | 4/2005 |
| EP | 0 787 475 | 8/1997 |
| EP | 1 341 201 | 9/2003 |
| EP | 1 541 061 | 6/2005 |
| EP | 2 060 207 | 5/2009 |
| WO | WO 03/085463 | 10/2003 |

* cited by examiner

*Primary Examiner* — Eduardo Colon Santana
*Assistant Examiner* — Gabriel Agared
(74) *Attorney, Agent, or Firm* — Henry M. Feiereisen LLC

(57) ABSTRACT

A first-fail-safe electromotive furniture drive includes at least one drive unit having at least one motor; at least one actuating device having at least two actuating units, each of which includes a motor contact element and a safety contact element; at least one supply unit; and at least one safety device. The furniture drive is equipped with a reporting device for displaying the functioning and a failure of the at least two actuating units and the safety device. The furniture drive includes at least one safety actuating device.

13 Claims, 9 Drawing Sheets

FIRST-FAIL-SAFE ELECTROMOTIVE FURNITURE DRIVE

CROSS-REFERENCES TO RELATED APPLICATIONS

This application is the U.S. National Stage of International Application No. PCT/EP2010/060143, filed Jul. 14, 2010, which designated the United States and has been published as International Publication No. WO 2011/006930 A1 and which claims the priority of German Patent Application, Serial No. 20 2009 005 020.3, filed Jul. 14, 2009, pursuant to 35 U.S.C. 119(a)-(d).

BACKGROUND OF THE INVENTION

The invention relates to a first-fail-safe electromotive furniture drive according to the preamble of claim 1.

Different designs of these types of electromotive furniture drives for adjustment of diverse furniture are known. These furniture include among others reclining and seating furniture, such as for example beds, slatted frames, television chairs. In particular in home and clinical care as well as in medicine, electromotive furniture drives are used in the corresponding furniture, for example in care beds and hospital beds. In these areas of use, pertinent rules, norms and laws apply wherein the so called first-fail-safety is very important.

First-fail-safety means that in the case of a first failure, for example of a component, no danger is created for the user and no undesired and/or unintended functions and/or unintended movements of movable furniture elements are caused, which create hazards.

EP 1 341 201 A2 describes an electromotive adjustment arrangement for furniture with a release relay via the contacts of which an overall motor current flows, which is then conducted to a further relay arrangement for impinging on a drive motor for causing an adjustment function. Assigned to this releasing relay is a function monitoring component, which controls the functionality of the releasing relay.

DE 103 41 705 A1 describes an arrangement for the operation of an electronically adjustable seat and/or reclining furniture with a device for supply current activation with a relay. The arrangement has a switching means for switching the relay for supply current activation, wherein the switching means have switching contacts which are independent of one another and can be operated simultaneously.

SUMMARY OF THE INVENTION

The object of the present invention is therefore to provide an improved first-fail-safe electromotive furniture drive.

The object is solved by a furniture drive which includes at least one drive unit with at least one motor; at least one actuating device with at least two actuating units which each have at least one respective motor contact element and one safety contact element, at least one supply unit, and at least one safety device, wherein the furniture drive includes a reporting device for displaying the functioning and a failure of the at least two actuating units and the safety device.

Accordingly, a fail-safe electromotive furniture drive is created, comprising: at least one drive unit having at least one motor; at least one actuating device having at least two actuating units, each of which have a motor contact element and a safety contact element; at least one supply unit; and at least one safety device. The furniture drive is configured with a reporting device for displaying the functioning and a failure of the at least two actuating units and the safety unit.

Further advantageous embodiments are the subject matter of the sub claims and follow from the description below.

With this, a first-fail-safe electromotive furniture drive is provided for example for use in medicine and/or care which demand first-fail-safety. The reporting device not only displays correct functioning of functional units but also an occurrence of failures in these. In an advantageously simple way, this not only creates a display of functioning and a failure of safety devices but also of actuating units.

A further advantage is that furniture drives with so called direct circuit are also included in the area of use of the invention. Direct circuit means that the motor current of the drive motor flows directly through the actuating device, wherein its switching contacts are configured for a high motor current (for example in the range of 1 to 10 A) in contrast to a low control current (for example in the range of several mA to 0.5 A) in the case of a relay circuit. These types of drives with direct circuit are for example situated in the low price sector, wherein the invention can also be used therefore in a simple design and therefore cost effectively. Of course, it can also be possible that the area of use of the invention includes controls, which have switching amplifier devices such as for example relay, semiconductor circuits and the like, which are controlled by a low control current and switch a high motor current. Here, only the low control current flows through the actuating device. Of course, combinations are also possible. It is provided that always one motor contact element and one safety contact element are mechanically coupled to one another. This coupling can be configured such that one of the contact elements is leadingly actuable. A simultaneous actuating is of course also possible.

The safety contact elements of the actuating units, in connection with the at least one safety device, switch the safety switch elements of the safety device. They can therefore be configured for a low control current.

In a further embodiment, the safety device is arranged in the actuating device. The safety switch element of the safety device can here be a relay and/or a semiconductor switch. The safety device can also be arranged in the supply unit, the voltage source and/or combined in these. Combined arrangement means that parts of the safety device can be disposed at different sites, for example in the supply unit and in the voltage source.

In an alternative embodiment the safety contact elements of the at least two actuating units form the at least one safety device. The safety contact elements are here configured for the high motor current and connected in series with the corresponding motor contact elements. This has the advantage to make a safety switch element in form of an additional relay unnecessary. In addition, a housing of the supply unit can be smaller. Of course, safety contact elements can also be constructed as semiconductor switches with control contact elements.

The reporting device can have optical and/or acoustic reporting elements. It is also possible to use haptic reporters. It is also conceivable that a device for forwarding reports to an external display or monitoring device is provided. The forwarding can for example take place wire based for example via the telephone network, electricity grid or internet. Of course, a wireless forwarding of reports, for example via WLAN or radio networks is also possible.

The reporting device can preferably have light emitting diodes as optical reporting elements. At least one diode unit is also usable to save components, or to design logical connections in a simple manner respectively. Of course, it is also possible that logical connections of certain states on power lines are analyzed by an analysis unit such as for example diode grid, diode logic, controller or the like, wherein the results are then sent to the reporting elements for output by the reporting elements.

In a further embodiment the reporting device has at least one light emitting diode with a high-impedance resistor. This allows for an easy way to scan a low current flowing through the internal resistor of the motor by the reporting unit, for determining a first failure.

In another embodiment the safety device is a part of a mains switching unit with auxiliary voltage source. This auxiliary voltage source can be a battery or an accumulator, for example also with corresponding charging connection, or a grid-connected auxiliary voltage transformer. An auxiliary voltage transformer makes a battery exchange unnecessary.

In an alternative embodiment the first-fail-safe electromotive furniture drive comprises the following: at least one drive unit with at least one motor; at least one actuating device with at least two actuating units which each have a motor contact element; at least one supply unit; and at least one safety device, wherein the furniture drive has at least one safety actuating device.

The safety actuating device guarantees a safe on and off switch by intentional actuating of more than one button/switch.

In a preferred embodiment the actuating device comprises the safety actuating device.

The furniture drive can with a reporting device for displaying functioning and a failure of the at least two actuating units and the safety device configured is, and The at least one safety actuating device can have at least one first main safety contact element, with which it is mechanically coupled, and the switching contacts of the first main safety contact element can be configured as electromechanical contacts for influencing the state of the safety device.

In an embodiment the at least one first main safety contact element is coupled to the safety device via a control block. By that, unambiguous control states are possible, namely by the control block having an ON-operating sate and an OFF-operating state.

The control block can be switched by the at least one first main safety contact element into the On-operating state and the OFF-operating state.

As an alternative or in addition, the control block can be switchable from the ON-operating state into the OFF-operating state by a time delay block by means of a predetermined time delay.

A self locking state of the safety device can also be formed by a time delay block with a predeterminable time delay. This allows an automatic switching off of the safety device.

In a further embodiment the at least one safety actuating device can have at least one second main safety contact element, with which it is mechanically coupled, and the switching contacts of the second main safety contact element can be configured as electromagnetic contacts for influencing the state of the safety device.

The at least one first main safety contact element and the at least one second main safety contact element can, together with the safety device, form a self locking circuit having a simple design and a low number of components.

This self locking circuit can also be formed by a time delay block with a predetermined time delay. Thus, the time delay block can carry out multiple tasks and lower the number of components.

In yet another alternative embodiment, the at least one safety actuating device can have at least one third main safety contact element with which it is mechanically coupled and the switching contacts of the third main safety contact element can be configured as electromagnetic contacts for influencing the state of the safety device, wherein the third main safety contact element is configured as latching switch, rotary switch or sliding switch. This way, an unambiguously recognizable on- or off state of the safety device can be recognized. In addition, functions can be locked when the third main safety contact element is for example a key holder.

BRIEF DESCRIPTION OF THE DRAWING

The invention is now explained by way of exemplary embodiments with reface to the included drawings. It is shown in.

In the figures, components and functional elements or functional groups, respectively, which have same or similar functions, are provided with same reference signs.

DETAILED DESCRIPTION OF PREFERRED EMBODIMENTS

Figure 1:
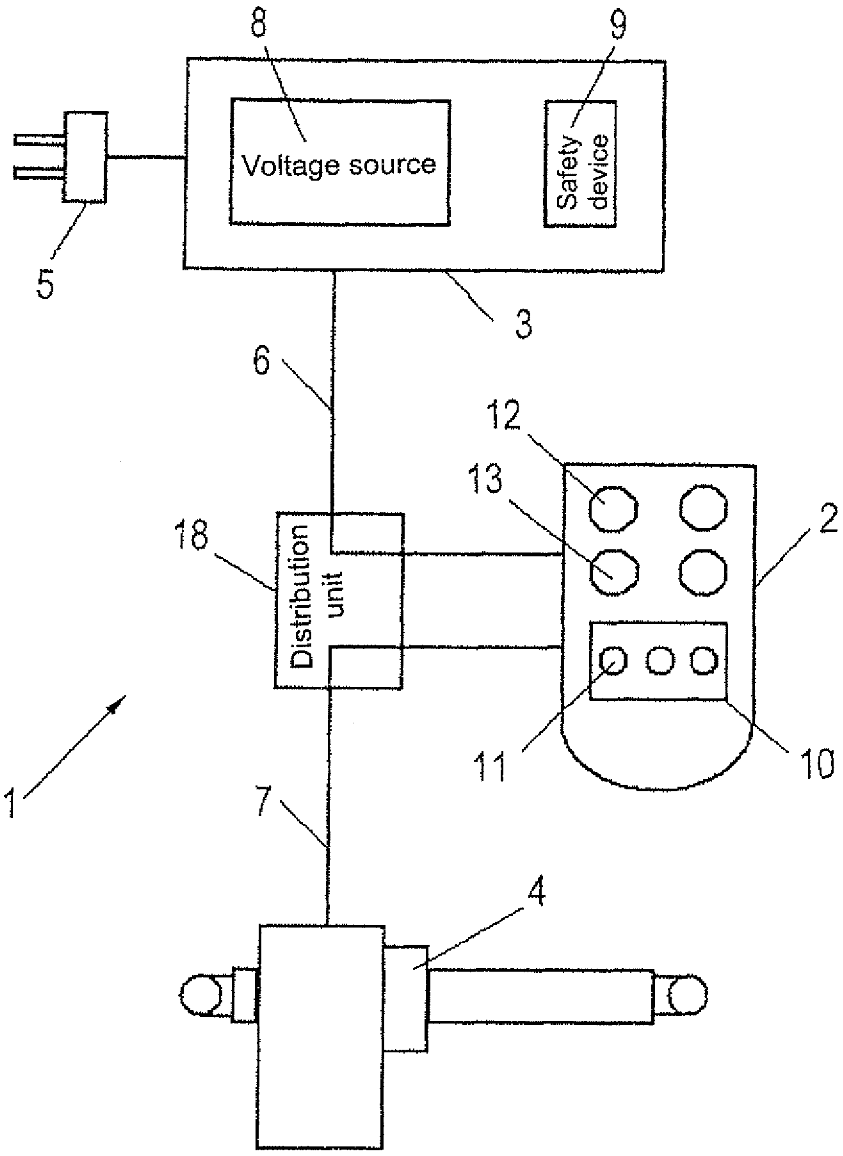
FIG. 1 a schematic block circuit diagram of a first embodiment of a furniture drive according to the invention.

FIG. 1 shows a schematic block circuit diagram of a first embodiment of an electromotive furniture drive 1 according to the invention.

In this example, the electromotive furniture drive 1 comprises an actuating device 2, a supply unit 3 and a drive unit 4 for the adjustment of an adjustable part or more of a furniture item which is not shown.

Here, the supply unit 3 has a voltage source 8, which is for example a transformer and/or an accumulator. The voltage source 8 is connectable to a supply network with mains connection 5. Further, the supply unit 3 is here equipped with a safety device 9 for the first-fail-safety of the electromotive furniture drive 1, which is explained in more detail below. The mains connection 5 can also be provided on the housing of the supply unit 3 as an overmolded, attached and/or pluggable connector section (for example embodiment as plug-in power supply.

The actuating device 2 is connected to the supply unit 3 via a distributor 18 for example a T-distributor. Connected to this distributor via a motor line 4, is also the drive unit 4, wherein the motor line here further extends into the actuating device 2. In other embodiments it is also possible that the distributor is located in the supply unit 3. In such a case the connecting line 6 also comprises the motor line 7. The distributor 18 can for example also be inserted into or attached to the drive unit, respectively.

Here, the actuating device 2 has two first actuating units 12 and two second actuating units 13 for actuating a respective drive unit 4. In this example, only one group 12, 13 is used since only one drive unit 4 is present. Of course, more than two drive units 4 can also be used, wherein then a correspondingly adapted actuating device 2 is used and has further actuating units 12, 13.

The furniture drive 1 is configured such that the motor current of the drive unit 4 flowing through the motor line 7 is conducted from the supply unit 3 to the actuating device 2, where it can be fed with corresponding polarity into the motor line 7 by the actuable actuating units 12, 13, for supplying the drive unit 8. This is a so called direct circuit furniture drive 1.

In addition, the actuating unit 2 is provided with a reporting device 10, which serves as display of functioning and also for displaying of a first failure and thus for first-fail-safety. The reporting device 10 can be configured optical and/or acoustic. Here, it has three optical reporting elements 11, which will be described in more detail below.

Figure 2:
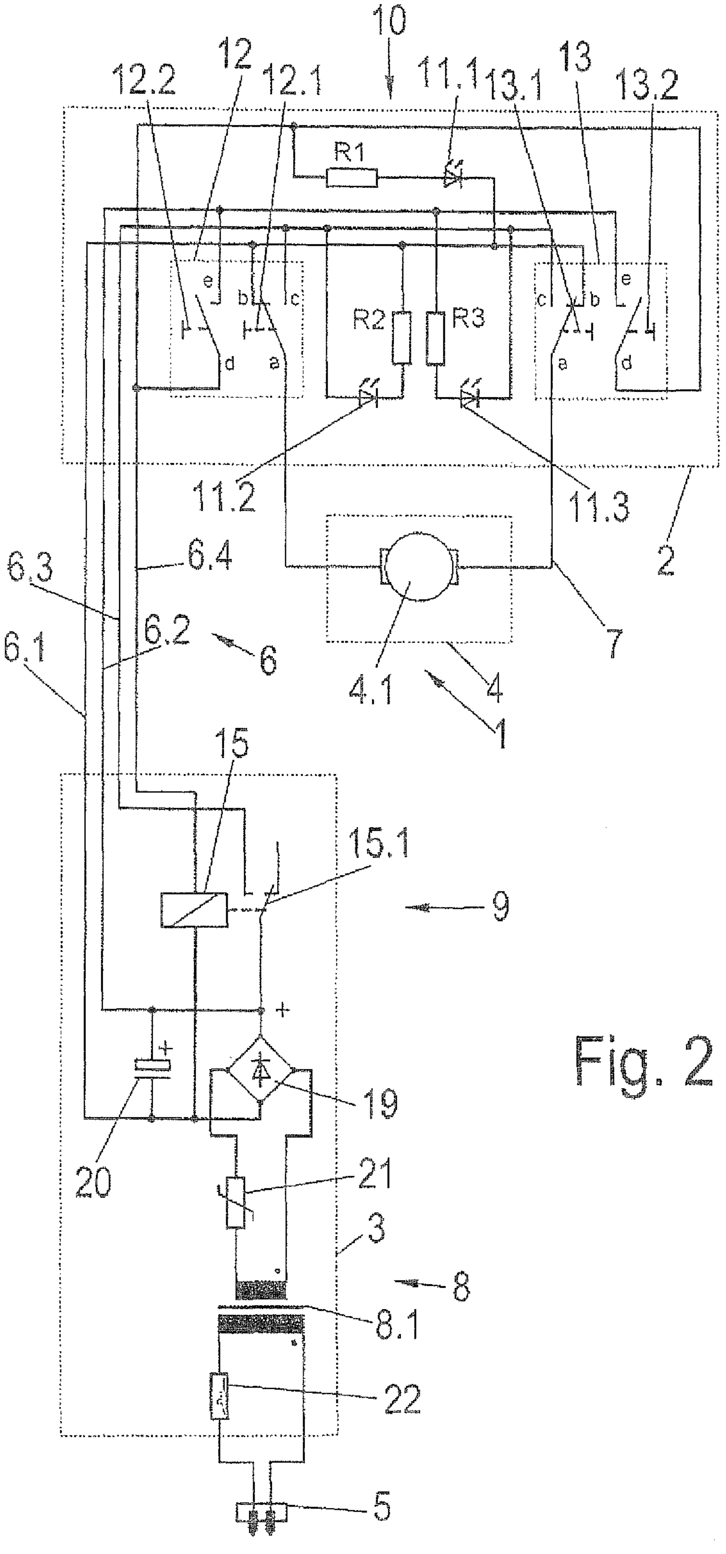
FIG. 2 a circuit diagram of the first embodiment according to FIG. 1.

A circuit diagram of the first exemplary embodiment according to FIG. 1 is shown in FIG. 2. For sake of simplicity the distributor 18 is not shown, but can be imagined easily.

Here, the supply unit 3 has a transformer 8.1 as voltage source 8, wherein a primary winding of the transformer 8 is connected to the mains connection 5 via a primary fuse 22 for example a thermo fuse in the primary winding, and wherein a secondary winding of the transformer 8 is connected to a rectifier bridge 19 via a resettable safety element 21, for the provision of d.c. voltage. A melting fuse can also be assigned to the primary fuse 22 and/or the safety element 21. Primary fuse 22 and/or safety element 21 can themselves be only melting fuses. A smoothing capacitor is installed downstream of the rectifier bridge. The negative pole of this d.c. voltage is connected to a main minus line 6.1 of the connecting line 6. A main plus line 6.2 of the connecting line 6 is connected to the positive pole of the rectifier bridge 19. Further, the positive pole is connected to a first safety switch contact 15.1 of a safety switch element 15, for example a relay. This first safety switch contact 15.1 is open in the case of non excitation of the safety switch element 15. A normally open contact connection of the first safety switch contact 15.1 leads to a motor plus line 6.3, and a control input of the safety switch element 15, here the winding of the relay, is connected to a control line 6.4 of the connecting line 6. Further, the safety switch element 15 is connected to the negative pole (main minus line 6.1) of the secondary d.c. voltage. The safety switch element 15 here forms the safety device 9. These lines 6.1 to 6.4 lead as connecting line 6 to the actuating device 2, to the actuating units 12, 13 of which these lines are connected, as explained below.

The actuating device 2—also referred to as so called hand switch—includes here the first actuating unit 12 and the second actuating unit 13. The actuating unit 12 in this example is a button with an actuating button, which acts on two contact elements, namely on a first motor contact element 12.1 and a first safety contact element 12.2. The first motor contact element 12.1 is configured as changeover, and the first safety contact element 12.2 as normally open contact. In the same way, the second actuating unit 13 is constructed with a second motor contact element 13.1 (changeover) and a second safety contact element 13.2 (normally open contact). The motor contact elements 12.1 and 13.1, as well as the safety contact elements 12.2 and 13.2 are actuable by means of a respective actuating button (not shown). This ability to actuate can be configured such that either both contact elements 12.1/12.2 and 13.1/13.2 are actuable simultaneously or time sequentially one after another. In the latter case the safety contact element 12.2/13.2 is actuated first ("leading contact element") and thereafter the motor contact element 12.1/13.1. When releasing, this sequence is reversed. Both contact elements 12.1/12.2 and 13.1/13.2 can have a respective common actuating element, for example a tappet. However, they can also be actuated simultaneously or one after another, respectively, by means of a type of rocker, wherein only one key press is required. Of course, both contact elements 12.1/12.2 and 13.1/13.2 are also actuable individually, wherein both must be actuated however to cause a movement of the drive unit 4.

The contact elements 12.2, 13.2 can also be configured such that they have a switching output, which for example comprises a semiconductor or a relay switch contact, which is controlled by means of a certain factor, such as for example as touch switch, proximity switch, touch screen and the like.

The respective changeover contact of the motor contact elements 12.1/13.1 is respectively connected with its connection a to a motor 4.1 of the drive unit 4 via the motor line 7. In the resting state, the changeover contact connects the connection a to a normally closed connection b. In the case of actuating, each changeover contact connects the connection a to a normally open connection c. The normally closed connections b are each connected to the main minus line 6.1 and the normally open connections c are each connected to the motor plus line 6.3. The safety contact elements 12.2 and 13.2 are each connected to the control line 6.4 with a connection d, and are each connected to the main plus line 6.2 with a connection e.

In addition, the actuating device 2 comprises the reporting device 10, which in this case comprises three display lights 11.1, 11.2 and 11.3 in the form of light emitting diodes (LED) with respective series resistors R1, R2 and R3. The first display light 11.1 is here connected to the control line 6.4 and the main minus line 6.1 via series resistor R1, wherein the cathode of the LED is connected to the main minus line. The second display light 11.2 is connected with the cathode to the main minus line 6.1 via the series resistor R2, and with its anode to the motor plus line 6.3. The third display light 11.3 is connected with its anode to the main plus line 6.2 via the series resistor R3, and with its anode to the motor plus line 6.3.

If now the first and the second actuating unit 12, 13 are actuated, to turn on the motor 4.1 in a corresponding direction of movement, the respective safety contact element 12.2, 13.2 switches on the safety switch element 15, whose safety switch contact 15.1 connects the main plus line 6.2 to the motor plus line 6.3. With this, the normally open connections b of the motor contact elements 12.1, 13.1 lie on the same potential as the main plus line 6.2, the motor 4.1 is correspondingly turned on and the first display light 11.1 lights up so long as the respective safety contact element 12.2, 13.2 is actuated. With this, the display light 11.1 indicates the functioning of the contact element 12.2, 13.2. When releasing the pressed actuating unit 12, 13 the first display light must go out. If this is not the case it indicates a first failure, namely that the actuated safety contact element 12.2, 13.2 has not switched off. If it is does not light up at all it indicates that the actuated safety contact element 12.2, 13.2 is without function. Display light 11.1 thus serves for display of functioning and a failure of the safety contact elements 12.2, 13.2 and contributes therefore to the first-fail-safety.

As soon as the motor plus line 6.3 lies on the potential of the main plus line 6.2, the second display light 11.2 lights up. It thus serves the display of functioning of the safety switch element 15. If it does not light up in spite of actuated safety contact element 12.2, 13.2, and the display of correct functioning of the same, the second display light indicates a first failure of the safety switch element 15 and also contributes to the first-fail-safety.

The series resistor R3 of the third display light 11.3 is particularly high impedance. When lighting up, the third display light 11.3 indicates a defective motor contact element 12.3, 13.1 for example in the case where the normally open contact a/c of a respective changeover contact of a motor contact element 12.1, 13.1 is stuck from smoldering or welding and does no longer open. In this case in the non-actuated state of the actuating device 2 the motor line 6.3 is connected to the main minus line 6.1 via the thus erroneously closed motor contact element 12.1, 13.1, the motor 4.1 which is connected to the motor contact element 12.1, 13.1 via the motor line 7, and the other motor contact element 12.1, 13.1 (via the internal resistance of the motor). In this way, the third display light 11.3 is switched on and thus indicates this first failure. Here, the current flowing through the motor is so low that the motor does not start.

Figure 3:
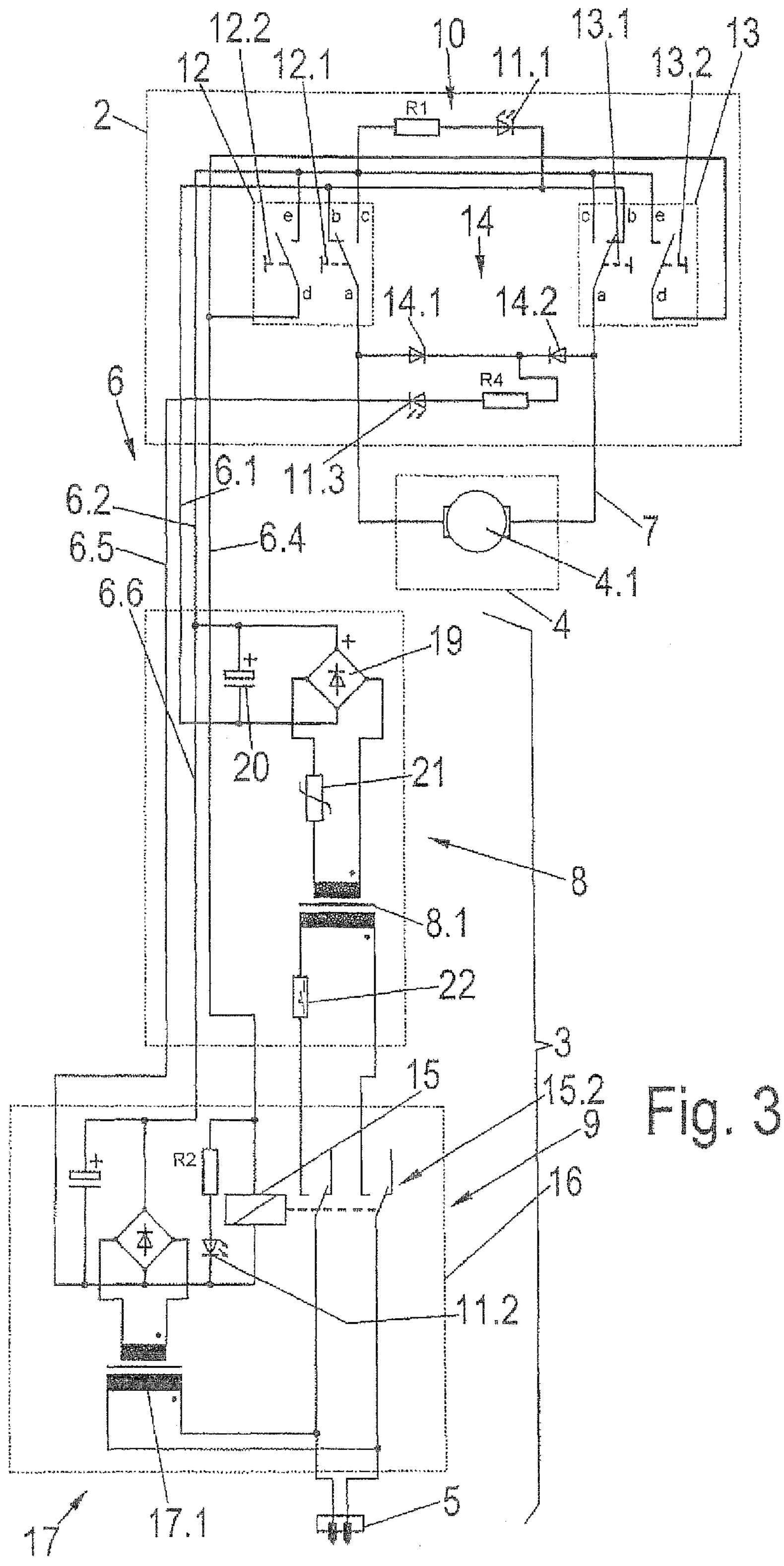
FIG. 3 a schematic block circuit diagram of a second embodiment of a furniture drive according to the invention.

FIG. 3 illustrates a circuit diagram of a second exemplary embodiment of the furniture drive 1 according to the invention wherein in contrast to the first exemplary embodiment according to FIG. 2 the safety switch element 15 is here arranged in a mains switch unit 16, which in the direction of the mains connection 5, is installed upstream of a voltage source 8, and which safety switch element 15 in the case of excitation, connects the voltage source 8 to the mains connection by means of a second safety switch contact 15.2. The safety switch contact 15.2 is here configured dipolar. Here, the safety switch element 15 also forms the safety device 9. The mains switch unit 16 is also referred to as mains cutoff. Because in the case of cutting off the mains connection 5 from the voltage source 8, no energy is available to excite the safety switch element 15, an auxiliary voltage source 17 is arranged with an auxiliary voltage transformer 17.1, which is permanently connected to the mains connection 5. The auxiliary voltage source 17 can however also be a battery and/or an accumulator. The auxiliary voltage source 17 delivers a d.c. voltage (here through bridge-rectifier and smoothing capacitor) whose negative pole is connected to the safety switch element 15, the cathode of the LED of the second display light 11.2, which is here arranged in the mains switch unit (but can also be arranged in the actuating device 2), and the auxiliary minus line 6.5 of the connecting line 6. The plus pole of the auxiliary voltage source 17 is connected to the main plus line 6.2 of the connecting line 6 via an auxiliary plus line 6.6. Thus, the main plus line always carries the potential of the auxiliary plus line 6.6. The safety switch element 15 is connected to the control line 6.4 with an excitation connection or a control connection, respectively. A motor plus line 6.3 is not present because the main plus line 6.2 and the main minus line 6.1 are switchable through the safety switch element 15.

The actuating units 12, 13 of the actuating device 2 are constructed in the same way as in the first exemplary embodiment. Their connections to the connecting cable 6 are as follows. The connections a of the motor contact elements 12.1, 13.1 are connected to the motor line 7 (as FIG. 2). The connections b also as in the first exemplary embodiment are connected to the main minus line 6.1. However, the connections c are connected to the main plus line 6.2. The connections d of the safety contact elements 12.2, 13.2 are together connected to the control line 6.4, and the connections e are connected to the main plus line 6.2 and to the auxiliary plus line 6.6.

When actuating an actuating unit 12, 13 a respective safety contact element 12.2, 13.2 switches on the safety switch element 15, through the potential of the auxiliary plus line 6.6 on the main plus line 6.2, which safety switch element 15 connects the voltage source 8 to the mains connection 5. Then, the main plus line 6.2 carries the potential of the voltage source 8, which potential is switched by the respective actuated motor contact element 12.1, 12.2 to the motor 4.1 for the movement of the motor.

The first display light 11.1 (display light configured as LED) in this second exemplary embodiment is connected to the main minus line 6.1 with the cathode, and with the anode to the main plus line 6.2 via the series resistor R1. It is it when the safety switch element 15 is turned on in the case of actuation. If it does not light up in the case of actuation, this indicates a first failure of the safety switch element 15.

The second display light 11.2 also lights up in the case of actuation and by not lighting up in the case of actuation indicates a defective safety contact element 12.2, 13.2.

The third display light 11.3 is connected to the anode via a diode unit 14 which is connected between the motor lines 7, via a resistor R4, wherein its cathode is connected to the auxiliary minus line 6.5. The diode unit 14 has a first diode 14.1 and a second diode 14.2, whose cathodes are interconnected and whose anodes are each connected to a motor line 7. The cathodes are connected to the third display light 11.3. When the motor 4.1 is turned on, which means in the case of actuation, the third display light lights up. If it does not light up, even in the case of actuation, it indicates a first failure of a motor contact element. If it continues to light up after releasing an actuating unit 12, 13 it indicates for example a stuck normally open contact a/c of a previously actuated motor contact element 12.1, 13.1.

Figure 4:
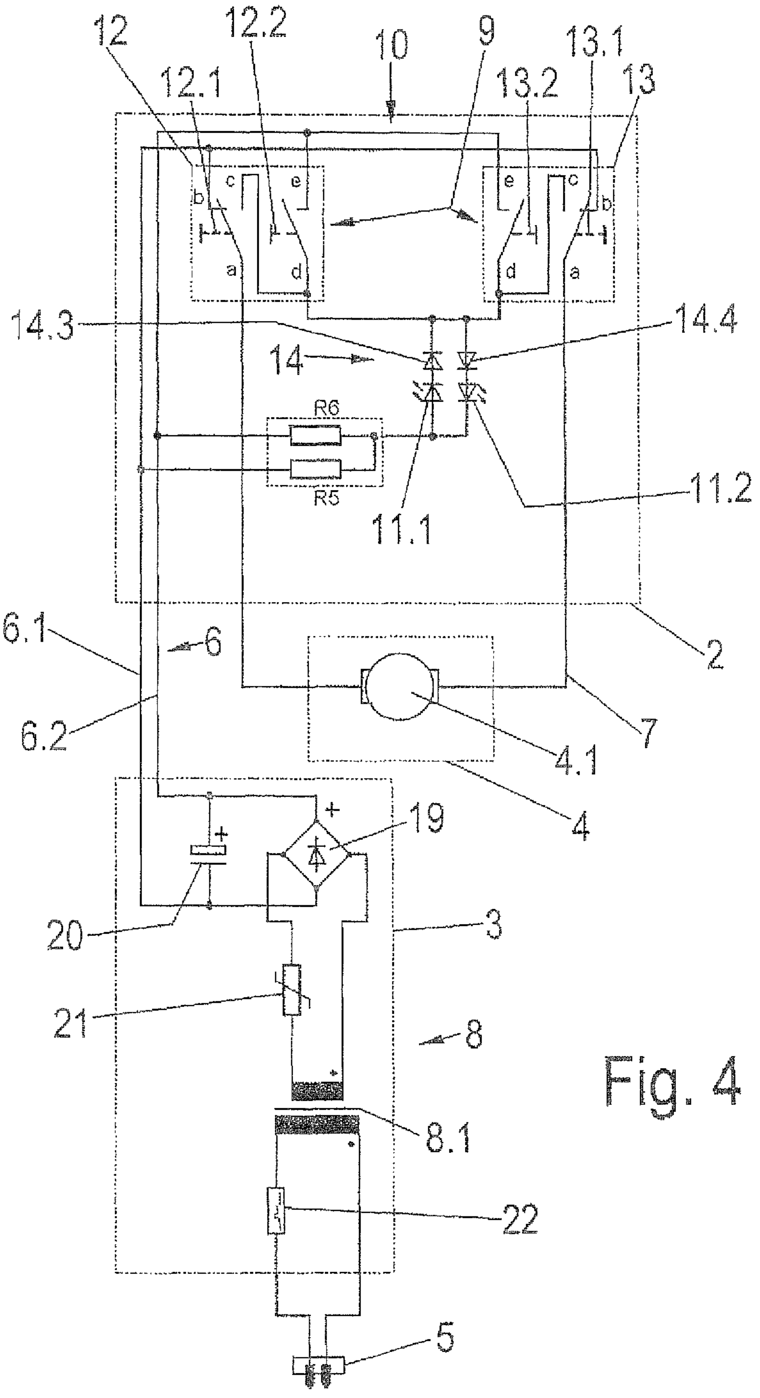
FIG. 4 a schematic block circuit diagram of a third embodiment of a furniture drive according to the invention.

FIG. 4 shows a third exemplary embodiment of the furniture drive 1 according to the invention, wherein an advantageously simple design of a first-fail-safe furniture drive 1 with direct switch is created.

In contrast to the first and second exemplary embodiments the connecting line 6 only comprises the main minus line 6.1 and the main plus line 6.2, which are supplied by the voltage source 8 (described in FIG. 2).

A further difference to the first and second exemplary embodiment is that the safety device 9 is formed by a respective safety contact element 12.2, 13.2 of the actuating units 12, 13.

While in the first and second exemplary embodiment the motor current of the motor 4.1 flows via the motor contact elements 12.1, 13.1, and the safety contact elements 12.2, 13.2 are only subjected to a control current for the safety switch element 15, in the third exemplary embodiment the safety contact elements 12.2, 13.2 are also subjected to the motor current, because they are connected in series with the normally open contact a/c of the respective corresponding motor contact element 12.1, 13.1. Here, the connections a, as in the first and second exemplary embodiment, are connected to the motor line 7 and the normally closed connections b to the main minus line 6.1. The normally open connections c of the motor contact elements 12.1, 13.1 are each connected to the connections d of the corresponding safety contact elements 12.2, 13.2 whose normally open connections e in turn are connected to the main plus line 6.2.

The first display light 11.1 (LED) is connected with its cathode to the anode of a third diode of a diode unit, which is connected in series to the first display light 11.1, and whose cathode is connected to the connection d of the first safety contact element 12.2 as well as to the second safety contact element 13.2. The anode of the first display light 11.1 is connected to half supply voltage via a high impedance voltage divider (R5, R6) which is connected between the main minus line 6.1 and the main plus line 6.2.

The second display light 11.2 (LED) is connected with its anode to the cathode of a fourth diode 14.3 of the diode unit 14, which is connected in series to the second display light 11.2, and whose anode is connected to the connection d of the first safety contact element 12.2 as well as to the connection d of the second safety contact element 13.2. The cathode of the first display light 11.1 is also connected to half supply voltage via the high impedance voltage divider (R5, R6).

When actuating an actuating unit 12, 13, the second display light 11.2 lights up for function control, so long as the actuation is ongoing. If a motor contact element 12.1, 13.1 is defective (normally open contact a/c stuck, welded or the like), negative potential lies at the cathode of the third diode 14.3 via the internal resistance of the motor 4.1 after release of the actuation, whereby the first display light 11.1 in this way indicates this first failure of a motor contact element 12.1, 13.1. If a safety contact element 12.2, 13.2 (normally open contact d/e stuck, welded or the like), positive potential of the main plus line 6.2 lies at the anode of the fourth diode 14.4 via the closed contact after release of the actuation. Then, the second display light 11.2 lights up and in this way indicates this first failure of a safety contact element 12.2, 13.2. The current flowing through the motor is so small that a break-away torque is not created starting the motor, and the motor thus does not move.

A first failure of the motor contact elements 12.1, 13.1, safety contact elements 12.2, 13.2, safety switch elements 15 and/or safety switch contacts 15.1 does not lead to an uncontrolled behavior of the furniture drive and is thus indicated immediately. With this a first-fail-safe electromotive furniture drive 1 in direct circuit is created.

Figure 5:
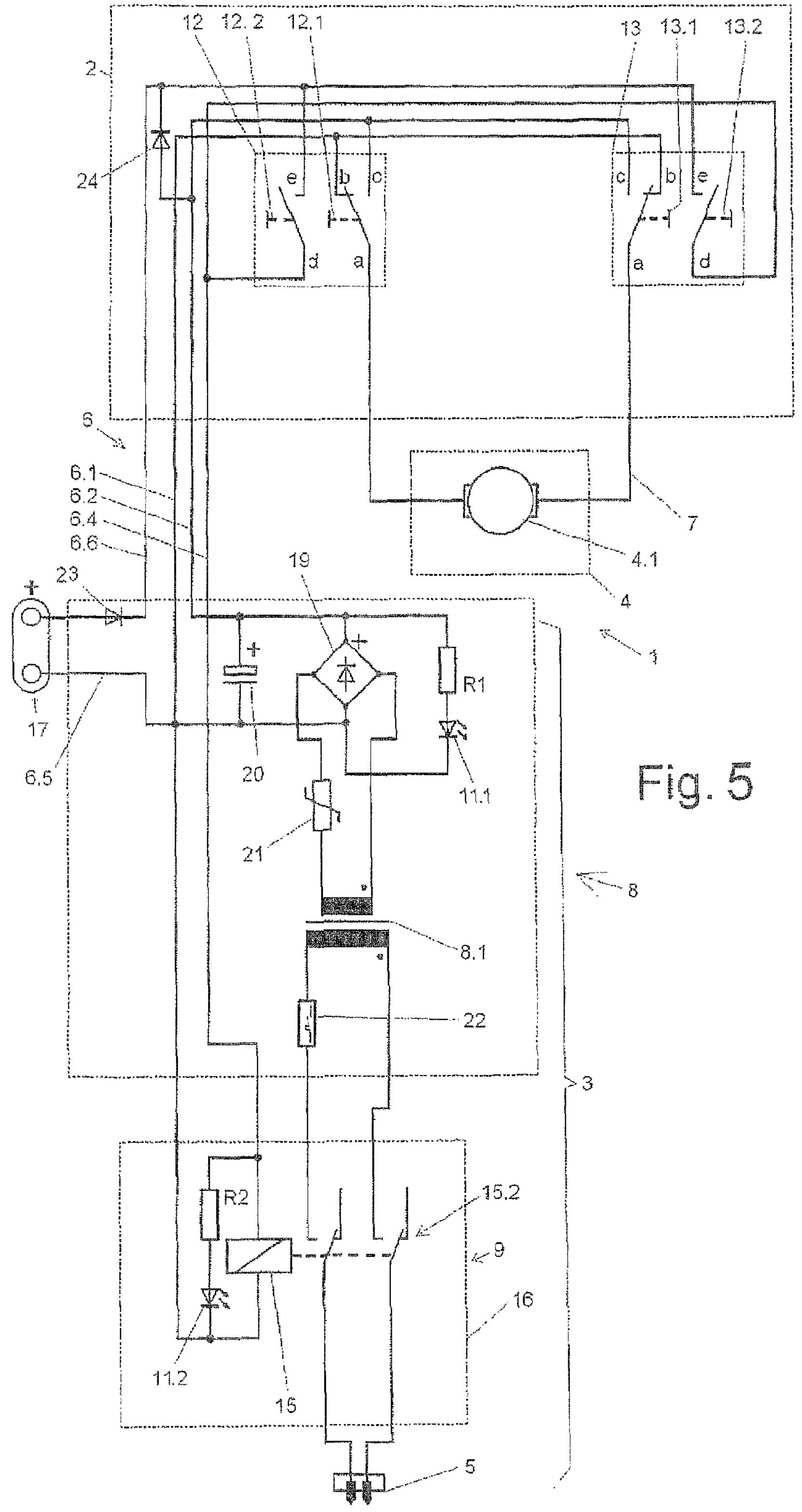
FIG. 5 a schematic block circuit diagram of a fourth embodiment of a furniture drive according to the invention.

In FIG. 5 a circuit diagram of a fourth exemplary embodiment of the furniture drive 1 according to the invention is shown.

In this example the safety switch element 15 is arranged, as in the second exemplary embodiment according to FIG. 3, in a mains switch unit 16, which is installed upstream of the voltage source 8, in the direction of the mains connection 5. In contrast to the second exemplary embodiment, the auxiliary voltage source 17 is here for example configured as a battery, rechargeable battery (accumulator) and/or capacitor with high capacitance. A plus pole of the auxiliary voltage source 17 is connected to the auxiliary plus line 6.6 via a first protector diode 23, wherein the negative pole is connected to the main minus line 6.1. The protector diode 23 serves on the one hand as reverse polarity protection and on the other hand as protection against the voltage, which is carried by the main plus line 6.2, which is generally higher than the auxiliary voltage. Because in a further difference to the second exemplary embodiment, a connection of the main plus line 6.2 to the auxiliary plus line is configured via a second protector diode 24, wherein the second protector diode 24 is connected to the main plus line 6.2 with its anode. Thus, the main plus line 6.6 carries always the potential of the auxiliary voltage, lithe voltage source 8 is switched on, the auxiliary plus line 6.6 carries the potential of the first protector diode 23 until the cathode of the first protector diode 23 and after the cathode the potential of the main plus line 6.2 less the forward voltage of the second protector diode 24.

Also in the fourth exemplary embodiment the cathode of the LED of the second display light 11.2 is arranged in the mains switch unit 16 and connected to the auxiliary minus line 6.5 and the main minus line. The safety switch element 15, as in the second exemplary embodiment, is connected to the exciter connection or the control connection, respectively, to the control line 6.4. Here as well, a motor plus line 6.3 is not present because the main plus line 6.2 and the main minus line 6.1 are switchable by the safety switch element 15.

The actuating units 12, 13 of the actuating device 2 are constructed as in the second exemplary embodiment. Their connections to the connecting cable 6 are as follows. The connections a of the motor contact elements 12.1, 13.1 are connected to the motor line 7 (as FIGS. 2 and 3). The connections b as in the first and second exemplary embodiments are also connected to the main minus line 6.1 and the connections c are connected to the main plus line 6.2. The connections d of the safety contact elements 12.2, 13.2 together are connected to the control line 6.4, wherein the connections e in contrast to the second exemplary embodiment are connected to the auxiliary plus line 6.6.

When actuating an actuation unit 12, 13, a respective safety contact element 12.2, 13.2, through the potential of the main plus line 6.6, switches the safety switch element 15 on, which connects the voltage source 8 to the mains connection 5. Then, the main plus line 6.2 carries the potential of the voltage source 8, which is switched onto the motor 4.1 through the respective actuated motor contact element 12.1, 13.1 for the movement of the motor 4.1. At the same time, the potential of the main plus line 6.2 is then applied to the auxiliary plus line 6.6 and conducted onto the safety switch element 15 via the respective closed safety contact element 12.2, 13.2. This is advantageous when the auxiliary voltage source 17 has only a limited capacity, which is sufficient for switching on the safety switch element 15 but not for maintaining of a switched-on state of the safety switch element 15. Thus, auxiliary voltage sources 17 with little installation space can be used.

The first display light 11.1 (display light configured as LED) in this fourth exemplary embodiment is connected to the main minus line 6.1 with the cathode and with the anode to the main plus line 6.2 via the series resistor R1. It lights up when the safety switch element 15 is switched on when actuating. If it does not light up when actuating, this indicates a first failure of the safety switch element 15.

The second display diode 11.2 lights up also when actuating and by not lighting up when actuating indicates a defective safety contact element 12.2, 13.2.

Figure 6:
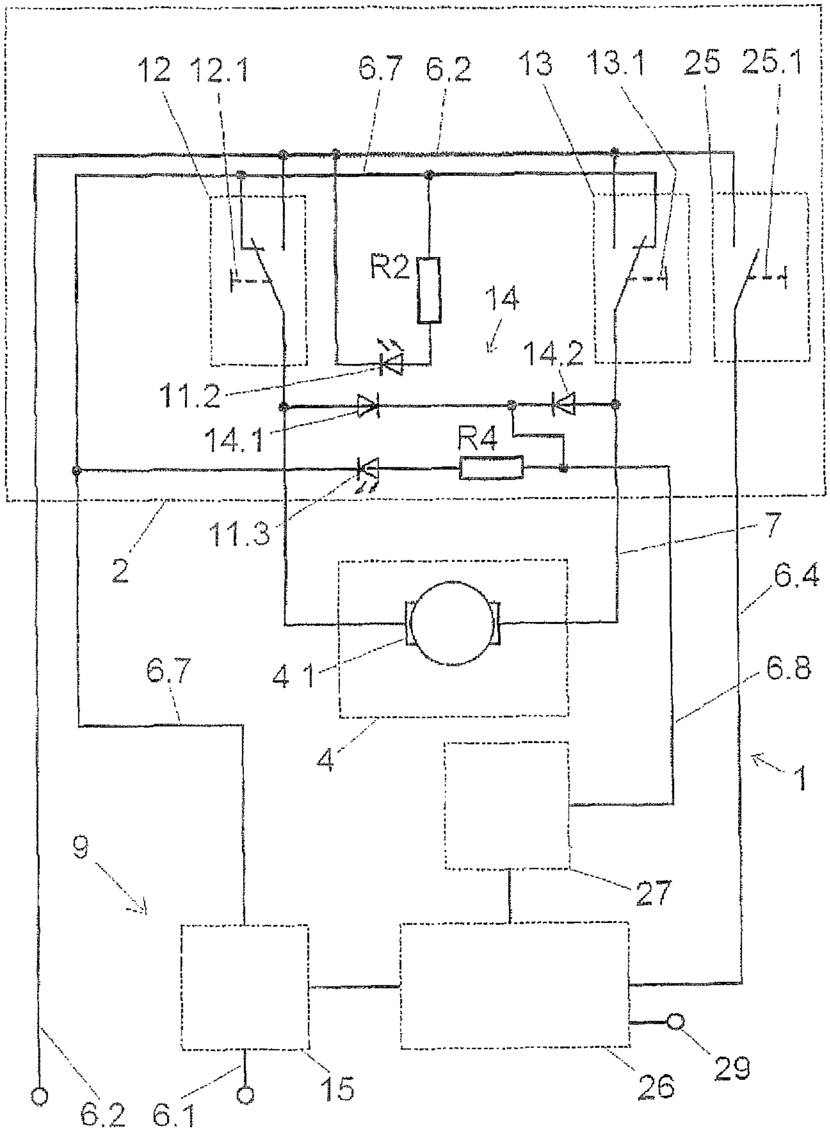
FIG. 6 a schematic block circuit diagram of a fifth embodiment of a furniture drive according to the invention.

FIG. 6 shows a circuit diagram of a fifth exemplary embodiment of the furniture drive 1 according to the invention. Here, the actuating device 2 has at least one safety actuating device 25 which is mechanically coupled to at least one first main safety contact element 25.1. The switching contacts of the first main safety contact element 25.1 are configured as electromechanical contacts and influence the state or the activity, respectively, of the safety device 9, in that the safety switch element 15.1 is switched on and/or the position of the switch of the at least one main safety contact element 25.1 is changed.

In this fifths exemplary embodiment, the at least one main safety contact element 25.1 is configured as normally open contact and connected to the main plus line 6.2. Via a control line 6.4 it is connected to a control block 26, which itself is connected to the safety switch element 15. Here, the control block 26 is connected to a time delay block 27, which is connected to the diode unit 14 via a signal line 6.8 in such a way that its connection is connected to the cathode of the first diode 14.1 and the second diode 14.2. In addition, the control block 26 has an additional input 29 for connecting further signal generators for example an overcurrent switch off of the motor 4.1, which is not shown.

The main safety contact element 25.1 is here switched as so called start sensor. This start sensor is actuated by an actuator of the motor 4.1. When pressing the start sensor or the main safety contact element 25.1 respectively, the control block 26 is switched to an ON-operating state and itself switches the safety switch element 15, for example a relay as in the first exemplary embodiment, on. The safety switch element 15 then connects the main minus line 6.1 to a motor minus line 6.7. The motor 4.1 can be switched into the desired adjustment direction via the actuating units 12 and 13. When switching the motor 4.1 off, a signal transmission occurs via the signal line 6.8 to the time delay block 27, which after a predetermined period of time, switches the control block 26 from the ON-operating state back to an OFF-operating state, wherein the safety switch element 15 disconnects the main minus line 6.1 from the motor minus line 6.7, Via the additional control input 29, a resetting of the control block 26 is also possible. Another embodiment provides for a time delay block 27, which when actuating the actuating units 12, 13, after a predetermine period of time immediately switches the control block 26 back from the ON-operating state to an OFF-operating state.

In a not shown embodiment, the control block 26 can be provided with a so called T-flip-flop which, through the main safety contact element 25.1, is switched on by a first actuating and turned off by a second actuating.

The second display light 11.2 indicates, that the motor minus line 6.7 is live. This means that, in the case the main safety contact element 25.1 is turned off, a failure of the safety switch element 15 or the control block 26.

The third display light 11.3 lights up, when the motor 4.1 runs or the motor line is live, respectively. When the actuating units 12, 13 are not actuated and the safety switch element is still switched on, lighting thus indicates a failure of the actuating units 12, 13.

Figure 7:
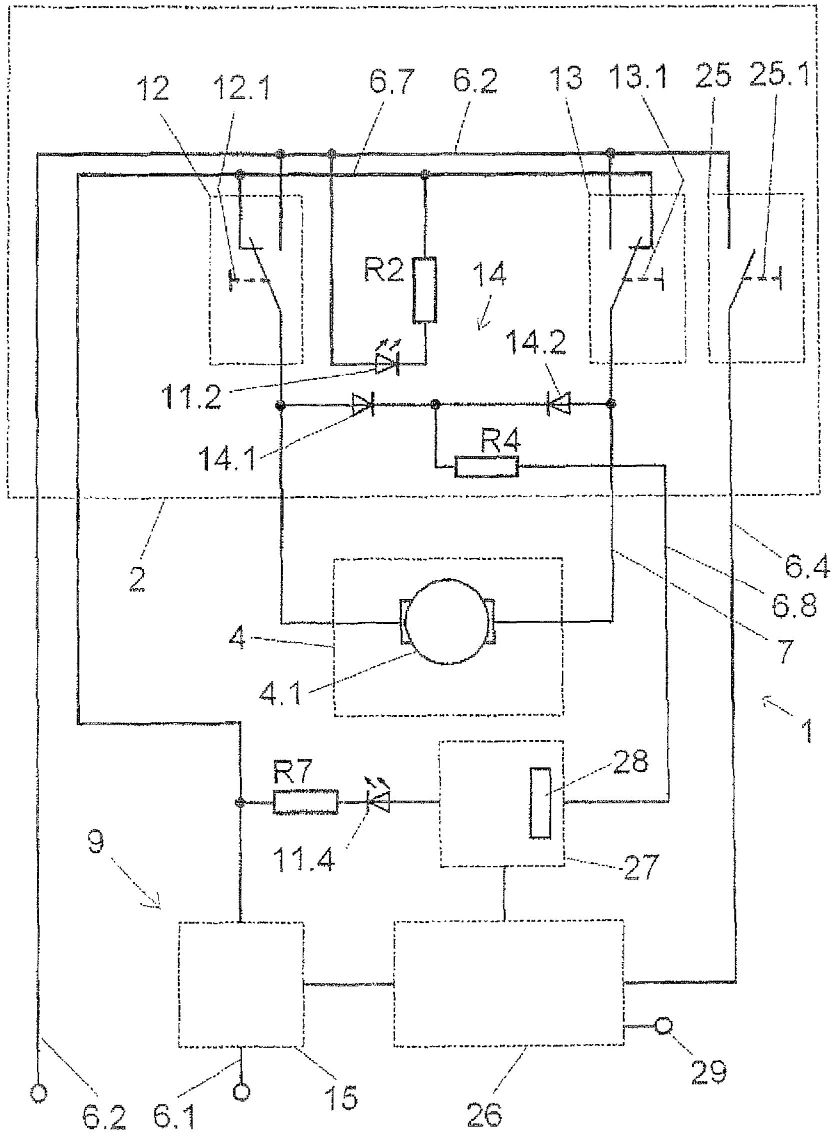
FIG. 7 a schematic block circuit diagram of a sixth embodiment of a furniture drive according to the invention.

In addition, it is possible that only the time delay block 27 carries out a resetting of the control block 26. FIG. 7 shows this in a sixth exemplary embodiment. Here, the time delay block 27 has a signal processing 28, which processes the signal of the signal line 6.8 already when the motor 4.1 is turned on such that, when the motor 4.1 is turned on (or turned off) the time delay is initiated. Of course, many other variants of the time delay are conceivable. The fourth display light 11.4 indicates here the switched on state of the time delay block 27 and can thus indicate a failure of the same by constantly lighting up after the end of an actuating, or not lighting up when actuating the motor 4.1.

Figure 8:
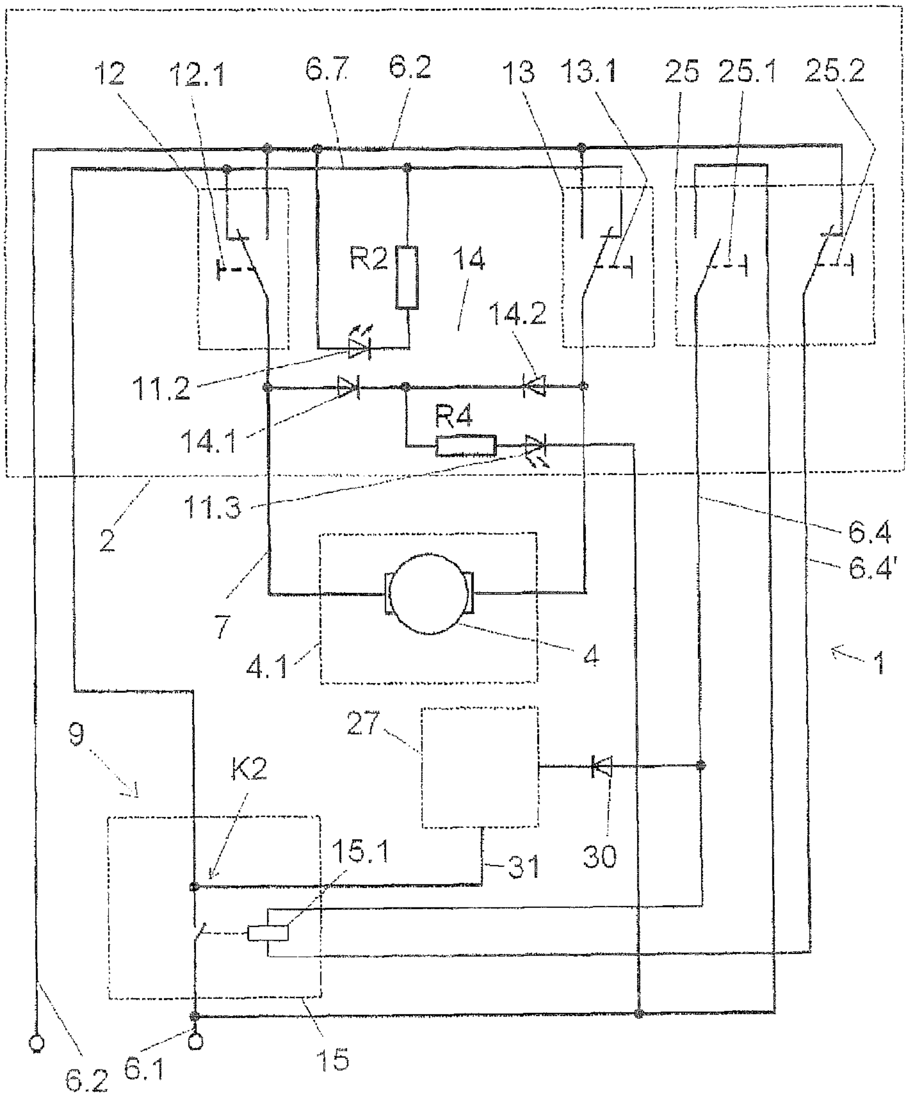
FIG. 8 a schematic block circuit diagram of a seventh embodiment of a furniture drive according to the invention.

According to an embodiment, which FIG. 8 shows as a seventh exemplary embodiment of the furniture drive 1 according to the invention, two main safety contact elements 25.1 and 25.2 are provided and connected in a switching circuit to the at least one safety switch contact K2 of the safety switch element 15 (here a relay 15.1) in such a way that the first main safety contact element 25.1 closes the contact of the at least one safety switch contact K2, while when actuating the second main safety contact element 25.2, the at least one safety switch contact 15.2 is opened again. Both main safety contact element 25.1 and 25.2 are in this case configured as buttons and are, together with the at least one safety switch contact 15.2, connected to a self locking switch, wherein the first main safety contact element 25.1 activates the self locking as normally open contact and start button and switches the at least one safety switch contact from its resting position into a permanent switched on state. This is achieved in that the first main safety contact element 25.1 connects the main minus line 6.1 to the relay 15.1, which is connected to the main plus line 6.2 via a further control line 6.4' and the closed normally closed contact of the second main safety contact element 25.2, and attracts. According to this embodiment the second main safety contact element 25.2 reverses the self locking of the relay 15.1 again by being pressed, and the at least one safety contact K2 returns to its resting state.

Optionally, the time delay block 27 can additionally or by itself form a self locking via a connecting line 31 to the motor minus line 6.7 and via a connecting diode 30, which is connected to the control line 6.4. When pushing the start button 25.1 the safety contact K2 closes, wherein the time delay 27 applies the potential of the motor line 6.7 to the control line 6.4 via the connecting line 31, whereby the relay remains attracted. At the same time the time delay is initiated, which, after a predetermined period of time interrupts this self locking connection, whereby the relay 15.1 drops out. The display lights 11.2 and 11.3 are already described above.

Figure 9:
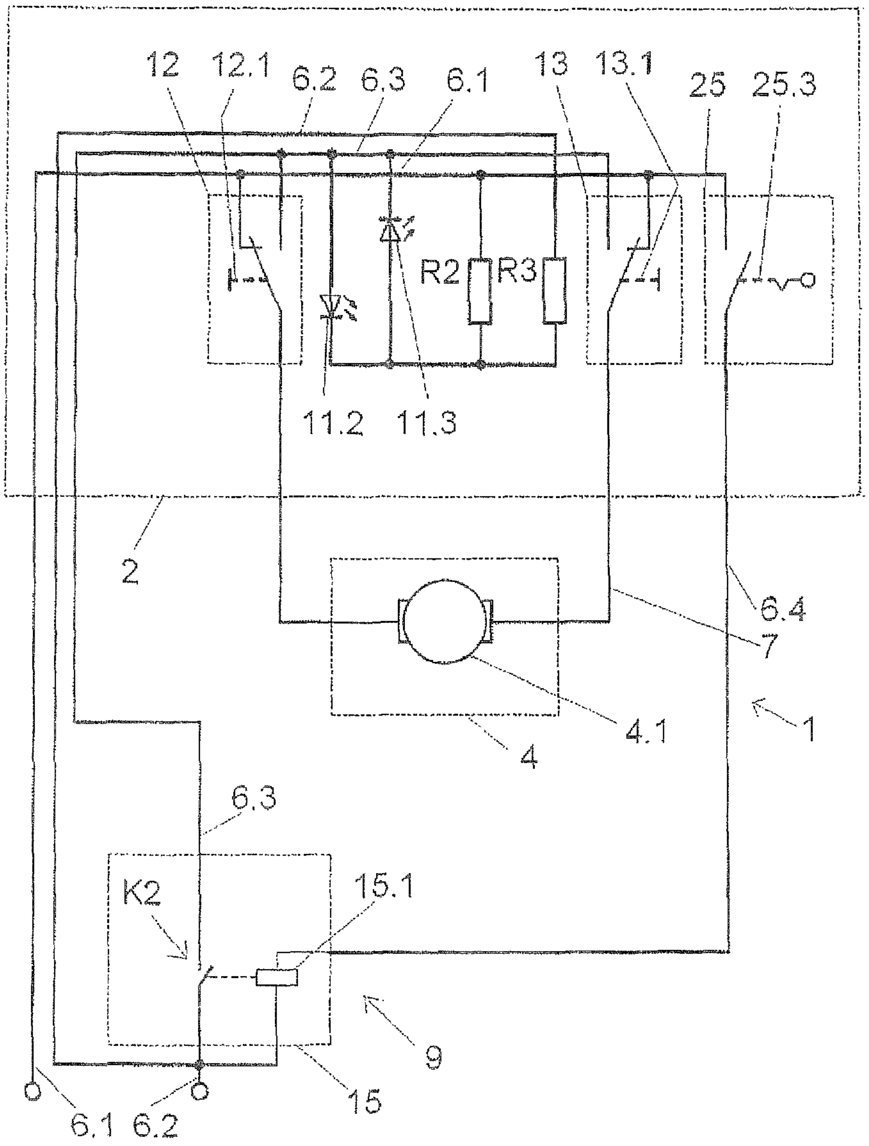
FIG. 9 a schematic block circuit diagram of a eighth embodiment of a furniture drive according to the invention.

An eight embodiment according to FIG. 9 provides for a latching switch as a third main safety contact element 25.3, which can for example be configured as rotary switch or slide switch and has latching switching positions. The contacts of the latching switch are connected to the safety switch element 15 or here to the shown relay 15.1 or form the at least one safety switch contact. In different embodiments, the latching switch can be actuated directly manually or only with the aid of an auxiliary tool for example in the form of a jumper or a key.

The display light 11.2 lights up, when the safety contact K2 is closed, wherein the motor plus line 6.3 is live. When switching on the motor 4.1, the display light 11.2 can light up dimmer. When opening the safety contact K2 the display light goes out.

By lighting up, the display light 11.3 indicates a failure of an actuating unit 12, 13. When the safety contact K2 is opened, a stuck contact can for example apply negative potential of the main minus line 6.1 to the cathode of the display light 11.3 via the motor winding of the motor 4.1 and switch it on, because its cathode lies positive potential of the main plus line 6.2.

The invention is not limited to the embodiments described above. It can be modified within the context of the included claims.

Thus, for example a fourth display light can be arranged in the actuating device 2 as supply voltage display, which diode indicates a defective safety element 21, 22 by not lighting up.

The display lights 11.1 and 11.3 of the reporting unit 10 can also be configured as multi color LED. For example, it is also possible, to use LED with integrated blinking switch, wherein the blinking function is used for failure display.

It is conceivable, that the safety switch element 15 of the first exemplary embodiment is arranged in the actuating device 2, wherein the voltage supply is for example a plug in power supply. This eliminates the need for a separate housing of the supply unit 3.

In the actuating unit 2, a so called overcurrent switch off can also be arranged for switching off a motor in the case of overload. Such an overcurrent switch off can of course also be arranged for example in the supply unit 3 and/at another appropriate site in the course of the power line, which carry the motor current when the motor is operated.

The safety contact element 12.2, 13.2 can also be configured as changeover contact, which makes it possible to lock individual drives against each other, when their readjustment functions pose a danger in the case of simultaneous actuation.

It is also conceivable that the actuating device 2 is provided with locks or with appropriate locking functions respectively, with which the voltage supply of the safety contact elements 12.3, 13.2 can be interrupted.

Of course, a lighting of the actuating device 2, for example with light diodes is possible.

Instead of a relay, the safety switch element 15 can also be a semiconductor switch. Thus, it is conceivable that also the safety contact element 12.3/13.2 as safety device 9 in the third exemplary embodiment (see FIG. 4) can be a combination of a mechanical normally open contact for controlling, and a power semiconductor switch for the motor current.

Of course, the actuating device 2 can also be provided with a further voltage source in the form of a battery or an accumulator, whereby a so called emergency turn off function is given.

Further connections for additional lights, such as for example a floor lighting, can for example be provided in the connecting line 6 by means of X-connectors.

A so called care LED can also be installed in the supply unit 3, whereby a line for the actuating device 2 can be saved. This Care-LED indicates a failure, when for example it lights up, does not light up, blinks, changes its color and the like, when the actuating device is actuated.

it is also possible, that the reporting elements 11 of the reporting device 10 are controlled by an analysis unit. This analysis unit can be configured for example as a diode grid (see diode unit 14), logic grid, controller and the like, which analyses voltage and/or current states of the different lines (also with previously predeterminable set values, set constellations and so on), compares these states and as a result correspondingly switches the reporting elements on/off, causes the reporting elements 11 to blink and/or change their color.

In an embodiment of the safety contact elements 12.2, 13.2, these have a movable carbon contact, movable metal contact or a movable foil contact, which is mechanically coupled to an actuating unit and can is configured to be actuated manually. The respective movable contact is operatively connected to a fixed contact, which, as carbon contact or as gold covered contact is connected to a fixed of flexible circuit board or foil in a firmly bonded or permanently fixed manner.

The previously described safety device 9 or the reporting unit 10 respectively, is generally regarded as a part of the furniture drive 1, wherein the safety device 9 and/or the reporting device 10 in a preferred embodiment can be arranged in only one component or separate from one another in different components of the furniture drive 1. Some arrangements have already been described in more detail previously, in summary the safety device 9 and/or the reporting device 10 can be integrated in a component of the furniture drive 1, at least however conductively connected to at least one component, wherein the components of the furniture drive 1 essentially include the supply unit 3, the distribution unit 18, the actuating device 2 and/or the drive unit 4.

The previously described overcurrent switch off according to a further embodiment has an electrical output, which is coupled to the safety device 9. Here, every drive unit 4 can be coupled to an overcurrent switch off, however one overcurrent switch off can also be coupled to a number of drive units 4 or preferably only to one drive unit 4. In case of an excessive current uptake of the drive unit 4 or in case of an excessive current output of the supply unit 3, a mechanical failure of the furniture or an electrical and/or mechanical failure of the furniture drive 1 can be present. The overcurrent switch off has a threshold switch and amplifier and recognizes this excessive current and sends an electrical signal to the safety device 9 and/or the reporting device 10. In an embodiment, the reporting device 10 is coupled to the Care-LED describe at the beginning, or formed by the Care-LED.

In a further embodiment of the safety device 9, the safety device 9 controls a breaker contact. This controlled breaker contact can be configured as electromagnetic relay contact or as electronic semiconductor contact, wherein via the contacts or via the semiconductor layers of the controlled breaker contact, the energy supply of the input or of the output of the supply unit 3 or of the input of a number, all or of each respective drive unit is transferred. If the safety device 9 detects a failure, it controls the controlled breaker contact, whereupon the contacts of the breaker contact open or are switched non-conductive, and interrupt or minimize the current flow to the at least one drive unit 4. In a further embodiment, the controlled breaker contact is configured as manually controllable breaker contact and according to further embodiments is integrated in the housing of the actuating device 2 or in a separate housing, which is connected to the actuating device with a cable. The manually controllable breaker contact is here configured as normally closed contact as a kind of emergency off-switch/button. The controlled breaker contact can be configured as manually reversible, as electrically reversible or as irreversible breaker contact. Thus, the drive unit 4 is guaranteed not to start, if a failure occurs and is detected. In addition to the types of display for indicating a failure described at the beginning, a failure of a motor 4.2 or an adjustment unit or a drive unit, respectively, to start can also be understood as display or as announcement of a failure.

In an embodiment described at the beginning, the adjustment unit 18 described at the beginning is described as T-distributor. This T-distributor has, in the simplest form, three electrical connections, which can be configured fixed, in the form of cable connections or pluggable, in the form of plug-in connections. Here, one connection is electrically connected to the supply unit 3, one connection is electrically connected to the actuating device 2 and one connection is electrically connected to the drive unit 4. According to different refined embodiments, the furniture drive 1 can have several drive units 4 and/or several, supply units 3 and/or several actuating devices 2. All drive units 4, supply units 3 and actuating devices 2 can be electrically connected to one another by only one distribution unit 18. According to another embodiment, several distribution units are provided, which are electrically connected to a number of drive units 4, supply units 3 and actuating devices 2. The most simple embodiment has at least one distribution unit 18, which is separate or attached to or integrated into, respectively, the furniture or a component of the furniture drive 1. According to another embodiment the at least one distribution unit 18 can be arranged in the supply unit 3, in the voltage source 8, in the actuating device 2 or in the drive unit 4. This means on the other hand that, in another embodiment the safety device 9 and/or the reporting device 10 can be arranged in the supply unit 3, in the voltage source 8, in the actuating device 2 and/or in the drive unit 1 or electrically connected to the same.

As at least suggested in the beginning, in different embodiments, the furniture drive 1 can have several actuating devices. The actuating devices 2 can be configured as manual switch or switch board securely fixed to the furniture, or as switching device which is only accessible to the care personnel. At least one actuating device 2 is available for a care providing person or a sick person, while further actuating devices 2 can only be accessible to the care personnel, because they are for example arranged spatially separated from other actuating devices 2 on the furniture. In a further embodiment a number of, or all actuating devices 2 can have a mechanical and/or electrical lock. Mechanical locks are known, which for example can be electrically switched by inserting a key. Electrical locks are also known, which can trigger a locking function via a key combination or for example, by using a magnetic key.

According to different embodiments, the supply unit 3 or the voltage source 8 respectively, mentioned at the beginning, can be configured as mains-independent supply unit 3.

Mains-independent supply units 3 have batteries or accumulators, which can be connected to upstream charging devices. Mains-dependent supply units 3 have transformers, for example with so called EI-core transformers, ring transformers or electronic transformers in form of switched mode power supplies with a high frequency transformer. According to different embodiments, the supply units 3 can be inserted into a socket, in another embodiment can have a sealed housing and be configured as floor device for mounting on the floor, and/or configured as installation devices for installation in the furniture.

The main safety switching element 25.1 can also be configured as a first-fail-safe main switch, wherein the contacts directly interrupt or switch respectively, the main minus line 6.1 and/or the main plus line 6.2.

LIST OF REFERENCE SIGNS

1 furniture drive
2 actuating device
3 supply unit
4 drive unit
4.1 motor
5 mains connection
6 connecting line
6.1 main minus line
6.2 main plus line
6.3 motor plus line
6.4, 6.4' control line
6.5 auxiliary minus line
6.6 auxiliary plus line
6.7 motor minus line
6.8 signal line
7 motor line
8 voltage source
8.1 main transformer
9 safety device
10 reporting device
11 reporting element
11.1 first display light
11.2 second display light
11.3 third display light
12 first actuating unit
12.1 first motor contact element
12.2 first safety contact element
13 second actuating unit
13.1 second motor contact element
13.2 second safety contact element
14 diode unit
14.1 first diode
14.2 second diode
14.3 third diode
14.4 fourth diode
15 Safety switch element
15.1 First safety switch contact
15.2 second safety switch contact
16 mains switch unit
17 auxiliary voltage source
17.1 auxiliary voltage transformer
18 distribution unit
19 rectifier bridge
20 smoothing capacitor
21 safety element
22 primary fuse
23 first protector diode
24 second protector diode
25 safety actuating unit
25.1 first main safety contact element
25.2 second main safety contact element
25.3 third main safety contact element
26 control block
27 time delay block
28 signal processing
29 additional control input
30 third protector diode
31 connecting line
a/b normally closed contact
a/c normally open contact
d/e normally open contact
R1 . . . 7 resistor

The invention claimed is:

1. A first-fail-safe electromotive furniture drive, comprising:
at least one drive unit having at least one motor;
at least one actuating device having at least two actuating units, each said actuating units having at least one motor contact element and one safety contact element;
at least one supply unit;
at least one safety device;
at least one safety actuating device, wherein the at least one safety actuating device comprises at least one first main safety contact element having switching contacts, wherein the at least one safety actuating device is mechanically coupled to the least one first main safety contact element, and wherein said switching contacts are configured as electromagnetic contacts for influencing a state of the safety device, and
a time delay block, said time delay block having a predetermine time delay, wherein a self locking state of the safety device is implemented by the time delay block.

2. The first-fail-safe electromotive furniture drive of claim 1, wherein the at least one actuating device comprises the at least one safety actuating device.

3. The first-fail-safe electromotive furniture drive of claim 1, further comprising a control block, wherein the at least one main safety contact element is coupled to the safety device via the control block.

4. The first-fail-safe electromotive furniture drive of claim 3, wherein the control block constructed for assuming an ON-operating state and an OFF-operating state.

5. The first-fail-safe electromotive furniture drive of claim 4, wherein the control block is switchable to the ON-operating state and the OFF-operating state by the at least one first main safety contact element.

6. The first-fail-safe electromotive furniture drive of claim 3, wherein the control block is switchable from the ON-operating state to the OFF-operating state by the time delay block as a function of the predetermine time delay.

7. The first-fail-safe electromotive furniture drive of claim 1, wherein the at least one safety actuating device further comprises at least one second main safety contact element having second switching contacts, wherein the at least one safety actuating device is mechanically coupled to the least one second main safety contact element, and wherein the second switching contacts of the second main safety contact element are configured as electromagnetic contacts for influencing a state of the safety device.

8. The first-fail-safe electromotive furniture drive of claim 7, wherein the at least one first main safety contact element and the at least one second main safety contact element together with the safety device form a self locking circuit.

9. The first-fail-safe electromotive furniture drive of claim 8, wherein the time delay block forms a self locking circuit.

10. The first-fail-safe electromotive furniture drive of claim 1, further comprising a reporting device for displaying a functioning and a failure of the at least two actuating units and the safety device.

11. A first-fail-safe electromotive furniture drive, comprising:

at least one drive unit having at least one motor;

at least one actuating device having at least two actuating units, each said actuating units having at least one motor contact element and one safety contact element;

at least one supply unit;

at least one safety device;

at least one safety actuating device, wherein the at least one safety actuating device comprises at least one third main safety contact element having third switching contacts, wherein the at least one safety actuating device is mechanically coupled to the least one third main safety contact element, wherein the third switching contacts of the at least one third main safety contact element are configured as electromagnetic contacts for influencing a state of the safety device, and wherein the third main safety contact element is configured as one of a latching switch, a rotary switch and a slide switch, and a time delay block, said time delay block having a predetermine time delay, wherein a self locking state of the safety device is implemented by the time delay block.

12. The first-fail-safe electromotive furniture drive of claim 11, wherein at least one actuating device comprises the at least one safety actuating device.

13. The first-fail-safe electromotive furniture drive of claim 11, further comprising a reporting device for displaying a functioning and a failure of the at least two actuating units and the safety device.

* * * * *